United States Patent
Fischerkeller et al.

(10) Patent No.: US 6,436,287 B1
(45) Date of Patent: Aug. 20, 2002

(54) FUEL PUMP MODULE AND METHOD FOR INSTALLING THE SAME

(75) Inventors: Rolf Fischerkeller, White Lake; Paul Wickett, Northville; Patrick M. Flynn, Fenton, all of MI (US)

(73) Assignee: Robert Bosch Corportion, Broadview, IL (US)

( * ) Notice: Subject to any disclaimer, the term of this patent is extended or adjusted under 35 U.S.C. 154(b) by 49 days.

(21) Appl. No.: 09/745,568

(22) Filed: Dec. 20, 2000

(51) Int. Cl.⁷ ................................................ B01D 35/02
(52) U.S. Cl. ..................................... 210/232; 210/416.4
(58) Field of Search .............................. 210/121, 259, 210/416.4, 232; 415/121.2

(56) References Cited

U.S. PATENT DOCUMENTS

| | | |
|---|---|---|
| 3,637,331 A | 1/1972 | Smith et al. |
| 3,900,397 A * | 8/1975 | Bell |
| 4,626,347 A * | 12/1986 | Neglio |
| 4,682,936 A | 7/1987 | Suzuki et al. |
| 5,049,271 A | 9/1991 | Cain |
| 5,084,166 A | 1/1992 | Shiraga et al. |
| 5,120,434 A | 6/1992 | Yoshida |
| 5,547,568 A | 8/1996 | Sasaki |
| 5,607,578 A * | 3/1997 | Ohkouchi et al. |
| 5,665,229 A * | 9/1997 | Fitzpatrick et al. |
| 5,795,468 A * | 8/1998 | Reising et al. |
| 5,875,816 A | 3/1999 | Frank et al. |
| 5,876,599 A | 3/1999 | Sylvester et al. |
| 5,900,148 A | 5/1999 | Izutani et al. |

* cited by examiner

Primary Examiner—David A. Simmons
Assistant Examiner—Fred Prince
(74) Attorney, Agent, or Firm—Michael Best & Friedrich LLP

(57) ABSTRACT

A fuel pump module including a fuel reservoir, a fuel pump communicating with the fuel reservoir and having a fuel outlet, and a fuel filter assembly movably coupled to the fuel reservoir to facilitate installation of the fuel pump module into a fuel tank. The fuel filter assembly communicates with the fuel outlet to filter fuel that has passed through the fuel pump. In one aspect of the invention, the fuel filter assembly is pivotally movable with respect to the reservoir. In another aspect of the invention, the fuel filter assembly is linearly movable with respect to the reservoir.

24 Claims, 6 Drawing Sheets

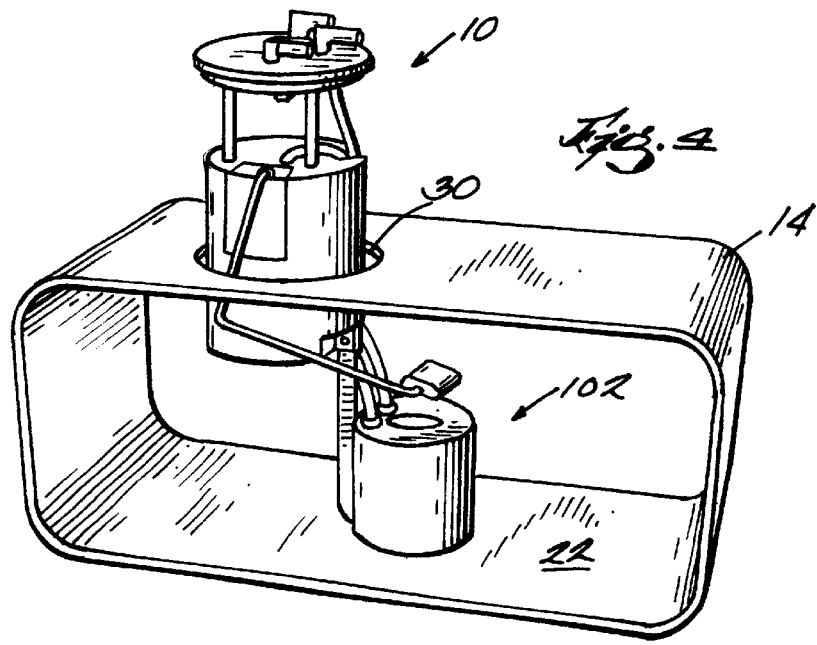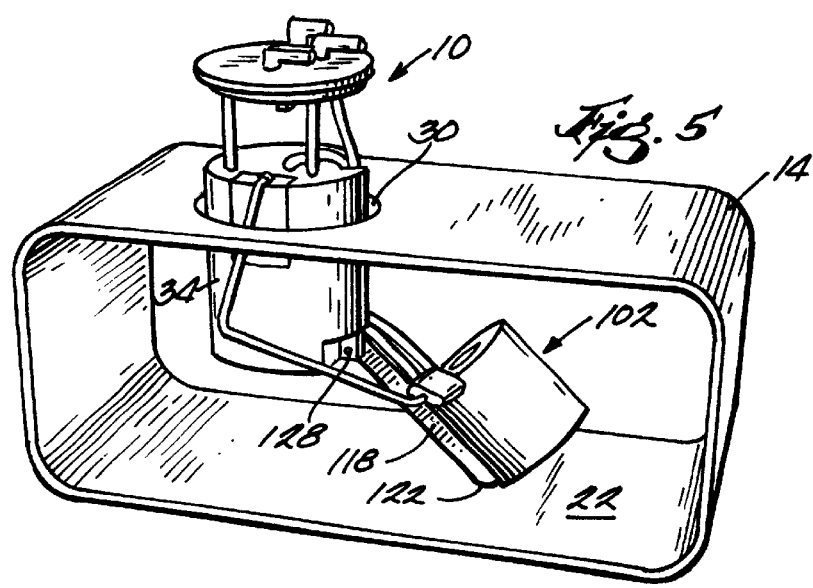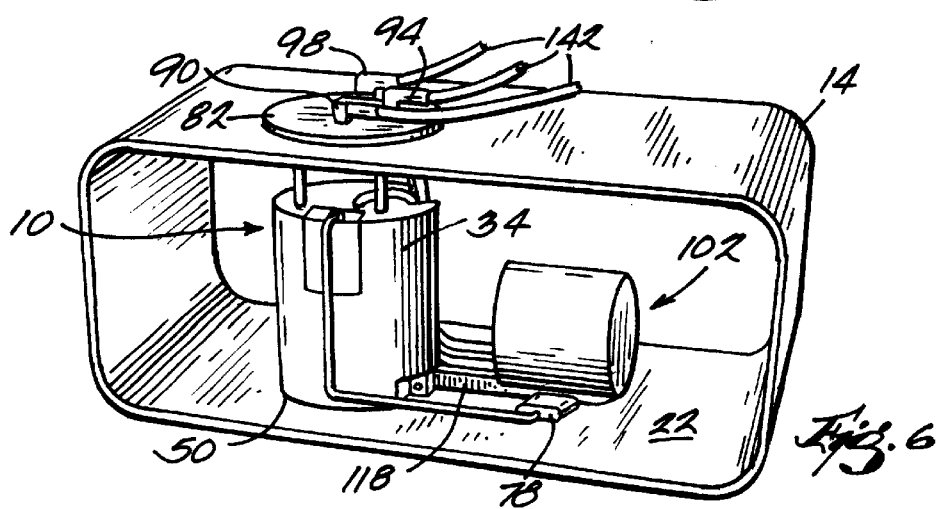

FUEL PUMP MODULE AND METHOD FOR INSTALLING THE SAME

BACKGROUND OF INVENTION

The invention relates to automotive fuel pump modules, and more particularly to the design and installation of automotive fuel pump modules.

The use of fuel pump modules to pump fuel from fuel tanks is well known in the automotive industry. A typical fuel pump module may include, for example, a fuel pump, a fuel reservoir, a fuel level sensor, one or more suction filters positioned upstream of the pump inlet, an in-line fuel filter positioned downstream of the pump outlet, and a pressure regulator. The fuel pump module usually rests in the bottom of the tank and will pump fuel from the tank until the tank is substantially empty.

Installation of the fuel pump module into the fuel tank is made possible by an opening or hole in the tank that provides access to the inside of the tank. The opening is normally formed in the top wall of the tank and is normally circular. All of the components of the fuel pump module must be packaged together to fit into the tank through the opening. It is often the case that the components are packaged within and below the substantially cylindrically-shaped reservoir such that the entire fuel pump module is no larger than a cylindrical envelope defined by the diameter of the opening and the height of the tank. Alternatively, some prior art fuel pump modules include an elongated suction filter that protrudes radially outwardly from the bottom of the reservoir. Due to the relatively flat and elongated shape of these suction filters, they can be inserted into the opening prior to insertion of the remainder of the fuel pump module without posing serious installation problems.

Attached to the typical fuel pump module is a flange that closes the opening after the fuel pump module is installed in the tank. Fuel exits from, and can also return to the fuel tank through ports formed in the flange.

The size and shape of a fuel tank is dictated by the available space under the vehicle body. While it has long been known to install the fuel tank adjacent to the rear of the vehicle, it has recently become more common to move the tank forward and install it under the back seat of the passenger compartment. Due to the space constraints associated with placing the tank under the back seat, the height of the tank must be reduced. The available setup height for the fuel pump module used in this low-profile tank is greatly reduced.

In addition to setup height reduction, fuel pump module manufacturers are also having to adapt to reductions in the size of the installation opening in the fuel tank. Recent regulations governing hydrocarbon evaporation and emission have forced fuel tank manufacturers to minimize the size of the opening, with some openings now being as small as four inches in diameter. The combination of reduced tank height and reduced tank opening size has posed problems for manufacturers of fuel pump modules. Simply stated, it is becoming difficult to package all of the necessary fuel pump module components in an envelope capable of being installed in the low-profile, small-opening tanks.

SUMMARY OF INVENTION

One of the major obstacles to overcome is the size and location of the in-line fuel filter in the fuel pump module. The in-line fuel filter communicates with the fuel pump outlet and filters particles from the fuel that could hinder the operation of the fuel injectors. Particularly, the in-line filter removes particles or debris that may have passed through the suction filter or that may have been deposited in the fuel as it was pumped through the fuel pump.

Unlike the suction filter, which can be a relatively thin member just outside the intake of the fuel pump, or alternatively can project radially outwardly from the bottom of the fuel pump so as not to utilize any significant portion of the available setup height, the in-line fuel filter is typically housed within the cylindrical reservoir and should be large enough to function effectively for the life of the vehicle. For larger vehicles and high performance vehicles with high fuel consumption, larger in-line filters are necessary. Unfortunately, it is becoming difficult or impossible to fit the large in-line fuel filters into the smaller fuel pump modules.

The present invention overcomes this problem by providing a fuel pump module having an in-line fuel filter coupled thereto in such a way as to permit installation of the fuel pump module into a low-profile, small-opening fuel tank. Because of the improved method of coupling the in-line filter to the remainder of the fuel pump module, no sacrifices need to be made with regard to the size of the in-line fuel filter. Installation of the fuel pump module remains simple and no extra tools are necessary.

More specifically, the invention provides a fuel pump module including a fuel reservoir, a fuel pump communicating with the fuel reservoir and having a fuel outlet, and a fuel filter assembly movably coupled to the fuel reservoir to facilitate installation of the fuel pump module into a fuel tank. The fuel filter assembly communicates with the fuel outlet to filter fuel that has passed through the fuel pump. In one aspect of the invention, the fuel filter assembly is pivotally movable with respect to the reservoir. In another aspect of the invention, the fuel filter assembly is linearly movable with respect to the reservoir.

The invention also provides a method of installing a fuel pump module in a fuel tank having an opening, the fuel pump module having a reservoir and a fuel filter assembly movably coupled to the reservoir. The method includes positioning the fuel filter assembly in a first position relative to the reservoir, inserting the fuel filter assembly into the fuel tank through the opening, inserting the reservoir into the fuel tank through the opening, and moving the fuel filter assembly with respect to the reservoir to a second position, thereby allowing the reservoir to be fully inserted into the fuel tank. In one aspect of the invention, moving the fuel filter assembly to the second position includes pivoting the fuel filter assembly with respect to the reservoir. In another aspect of the invention, moving the fuel filter assembly to the second position includes moving the fuel filter assembly linearly with respect to the reservoir.

Other features and advantages of the invention will become apparent to those skilled in the art upon review of the following detailed description, claims, and drawings.

BRIEF DESCRIPTION OF DRAWINGS

FIGS. 2–6 are perspective views of the fuel pump module of FIG. 1 being inserted into the fuel tank.

Figure 1:
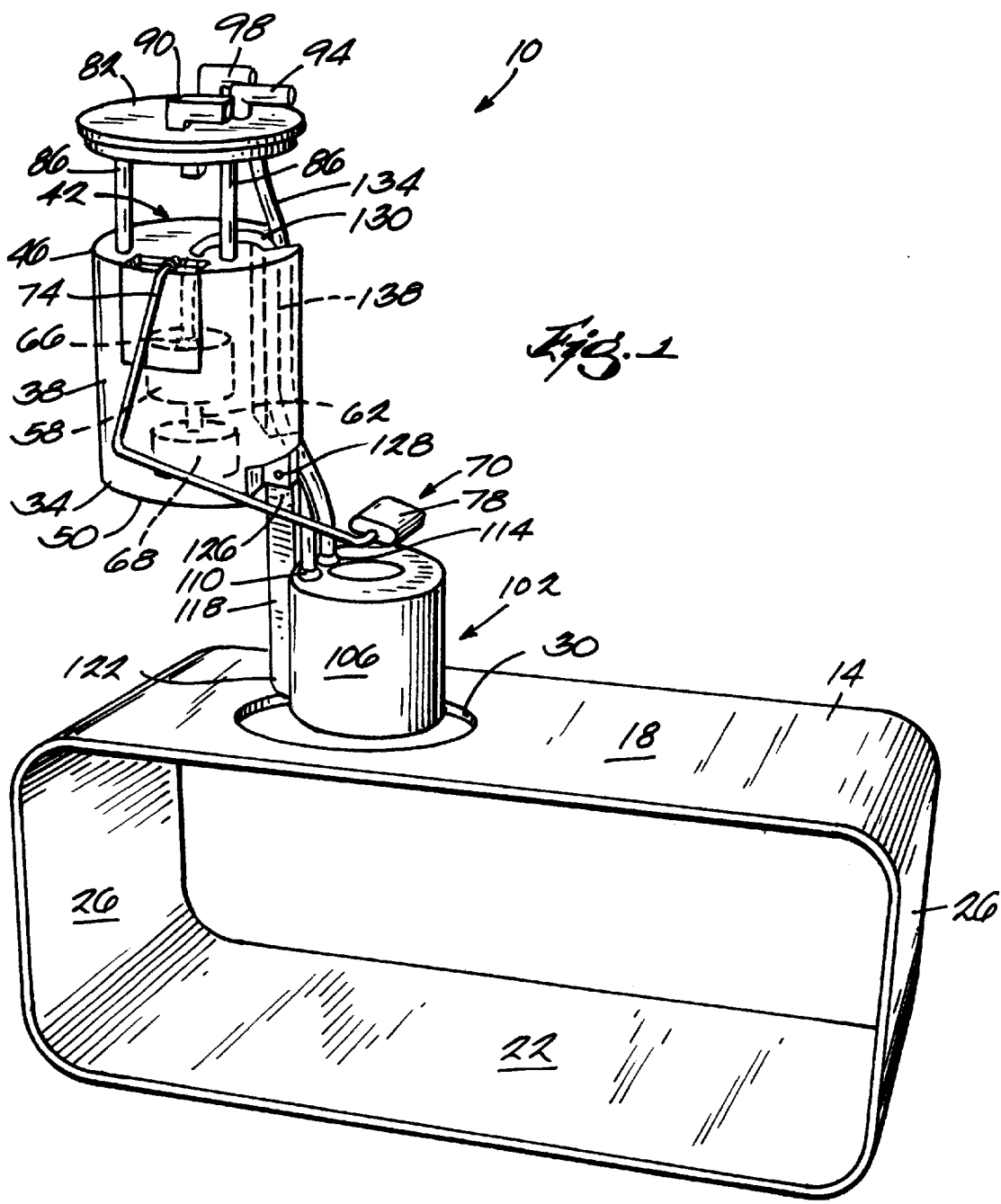
FIG. 1 is a perspective view of a fuel pump module embodying the invention, prior to being inserted into a fuel tank.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION

FIGS. 1–6 illustrate a fuel pump module 10 embodying the invention. The fuel pump module 10 can be inserted into a fuel tank 14 having top wall 18, a bottom wall 22, and four side walls 26 (only two are shown). The top wall 18 includes an opening 30 through which the fuel pump module 10 is inserted into the tank 14. The opening 30 is preferably circular, but can also be various other shapes. The tank 14 is generally described as a low-profile tank, meaning that the distance between the top wall 18 and the bottom wall 22 is substantially smaller than the distance between the top and bottom walls of standard prior art fuel tanks (not shown).

All of the components of the fuel pump module 10 described below can be made of any suitable fuel resistant materials, such as fuel resistant conductive plastics. The use of conductive plastics also helps reduce and/or eliminate electrostatic charges that tend to build up in the fuel tank environment.

The fuel pump module 10 includes a reservoir 34 sized to fit through the opening 30. The reservoir 34 is substantially cylindrical and has an outer wall 38 that defines an interior portion 42 for housing fuel and other fuel pump module components as is commonly understood. The outer wall 38 has respective upper and lower ends 46 and 50. The reservoir 34 is open on the upper end 46 and includes a reservoir inlet (not shown) on the bottom end 50. The reservoir 34 can be made by injection molding or any other suitable plastic forming technique.

Further included in the fuel pump module 10 is a fuel pump 58 that communicates with the reservoir inlet and the interior portion 42 to pump fuel. The fuel pump 58 includes a fuel inlet 62 that selectively receives fuel from either the tank 14 or the interior portion 42, and a fuel outlet 66 where fuel exits the fuel pump 58. A suction filter 68 filters fuel just before it enters the fuel pump 58. The suction filter 68 is shown schematically and can be of any known configuration, including an elongated, member extending radially from the reservoir 34. The location of the suction filter 68 is not critical. As shown in the figures, the fuel pump 58 is preferably located within the interior portion 42 of the reservoir, however, the fuel pump could also be located elsewhere.

The fuel pump module 10 also includes a fuel level sensor assembly 70 pivotally mounted to the reservoir 34. The fuel level sensor assembly 70 includes a rheostat fuel level sensing device (not shown) housed within a portion of the outer wall 38. A L-shaped arm 74 is pivotally connected to the rheostat device at one end, and supports a float 78 on the other end. The float 78 floats on the fuel in the tank 14 to provide a measure of the amount of fuel present in the tank 14 as is commonly known. It should be noted, however, that the use of a fuel level sensing device or any particular type of fuel level sensing device is not critical to the present invention.

The fuel pump module 10 further includes a flange 82 supported above the upper end 46 of the reservoir 34 by support members 86. The flange 82 is the same shape, preferably circular, as the opening 30 in the top wall 18 of the tank 14 so that the flange 82 closes and seals the opening 30 when the fuel pump module 10 is fully inserted. The flange 82 includes an electrical connector 90 for providing electrical power to the fuel pump 58 and the fuel level sensor assembly 70. The electrical connector 90 also provides for communication between the engine control unit (not shown), the fuel pump 58, and the fuel level sensor assembly 70. The flange 82 further includes an outlet port 94 that allows fuel to exit the fuel tank 14 and enter the external portion of the fuel system (not shown). The flange 82 also includes an inlet port 98 that allows unused fuel to be returned to the fuel tank 14.

The fuel pump module 10 also includes an in-line fuel filter assembly 102 movably coupled to the reservoir 34. The in-line fuel filter assembly 102 includes a substantially cylindrical filter housing 106 that houses filter media (not shown). A fuel inlet 110 and a fuel outlet 114 communicate with the filter media to provide access to and from the filter housing 106. An extension member 118 extends from the filter housing 106 and includes a radiused or tapered end 122 adjacent the filter housing 106, and a pivot end 126 spaced from the filter housing 106. The pivot end 126 is pivotally connected to the reservoir 34 at a pivot point 128 adjacent the lower end 50. Any suitable pivoting connection, including the single pivot pin connection shown in the figures, can be used. The components of the in-line fuel filter assembly 102 can be manufactured and assembled in any suitable fashion. For example, the housing 106, the extension member 118, the fuel inlet 110, and the fuel outlet 114 can be a single injection molded part capable of receiving and housing the filter media. Alternatively, the extension member 118 can be mounted in any suitable manner to a pre-existing in-line fuel filter.

A flexible inlet conduit 130 is connected between the fuel pump outlet 66 and the fuel inlet 110 to provide communication between the fuel pump 58 and the in-line fuel filter assembly 102. A flexible outlet conduit 134 is connected between the fuel outlet 114 and the flange outlet port 94 to provide communication between the in-line fuel filter assembly 102 and the external portion of the fuel system. Fuel exiting the fuel pump 58 enters the in-line fuel filter assembly 102 where it is filtered to remove any debris present. The fuel then exits the in-line fuel filter assembly 102 and passes through the remainder of the fuel system before being injected into the combustion chamber (not shown) by the fuel injectors (not shown).

In a preferred embodiment, the outer wall 38 of the reservoir 34 includes at least one conduit channel 138 that houses portions of the flexible conduits 130 and 134. The conduits 130 and 134 can be retained in the conduit channel 138 with any suitable securing straps or fasteners (not shown). Retaining the conduits 130 and 134 in the conduit channel 138 helps prevent binding and damage to the conduits 130 and 134 during installation of the fuel pump module 10 into the tank 14. It should be noted, however, that the conduit channel 138 is not a necessary feature of the present invention. The fuel pump module 10 can be installed successfully even when there is no conduit channel 138.

Figure 2:
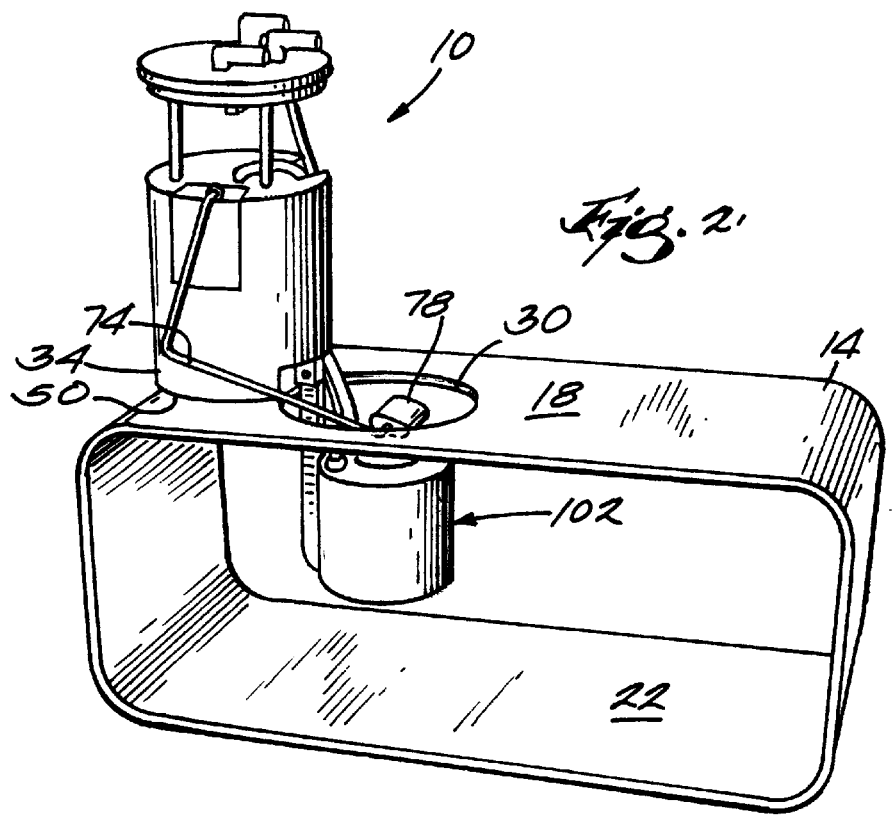

Installation of the assembled fuel pump module 10 into the fuel tank 14 occurs as follows. First, the in-line fuel filter assembly 102 is oriented in a first or installing position (see FIG. 1), wherein the in-line fuel filter assembly 102 is substantially below the lower end 50 of the reservoir 34. The extension member 118 is substantially in line with the edge of the reservoir 34. The in-line fuel filter assembly 102 is then inserted into the opening 30 as shown in FIG. 2 until the lower end 50 of the reservoir 34 is adjacent the top wall 18. The float 78 and a portion of the L-shaped arm 74 also enter the tank 14 through the opening 30.

Figure 3:
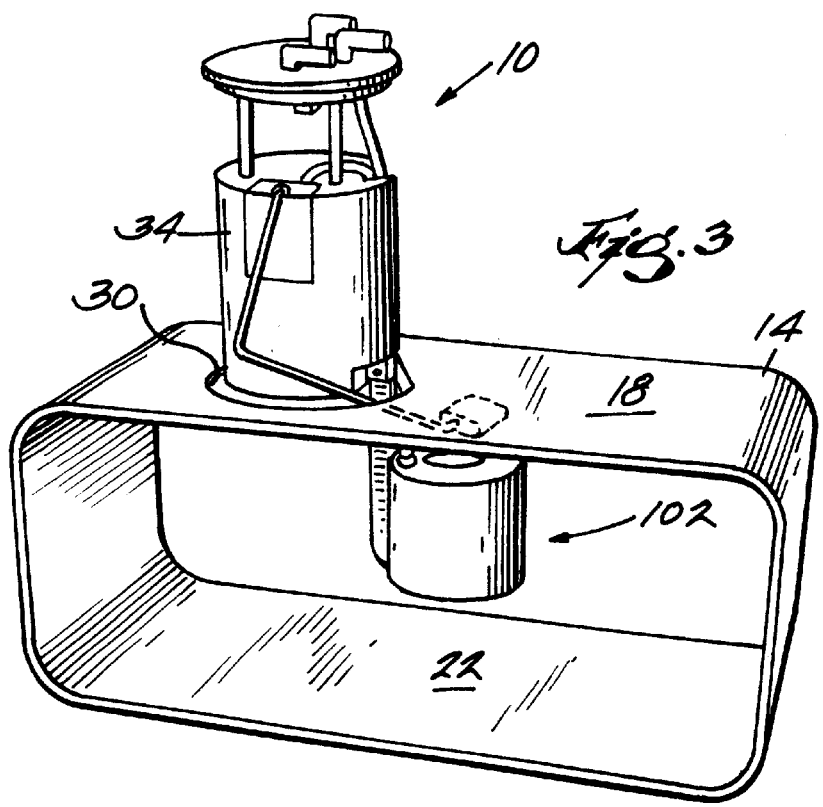
Figure 7:
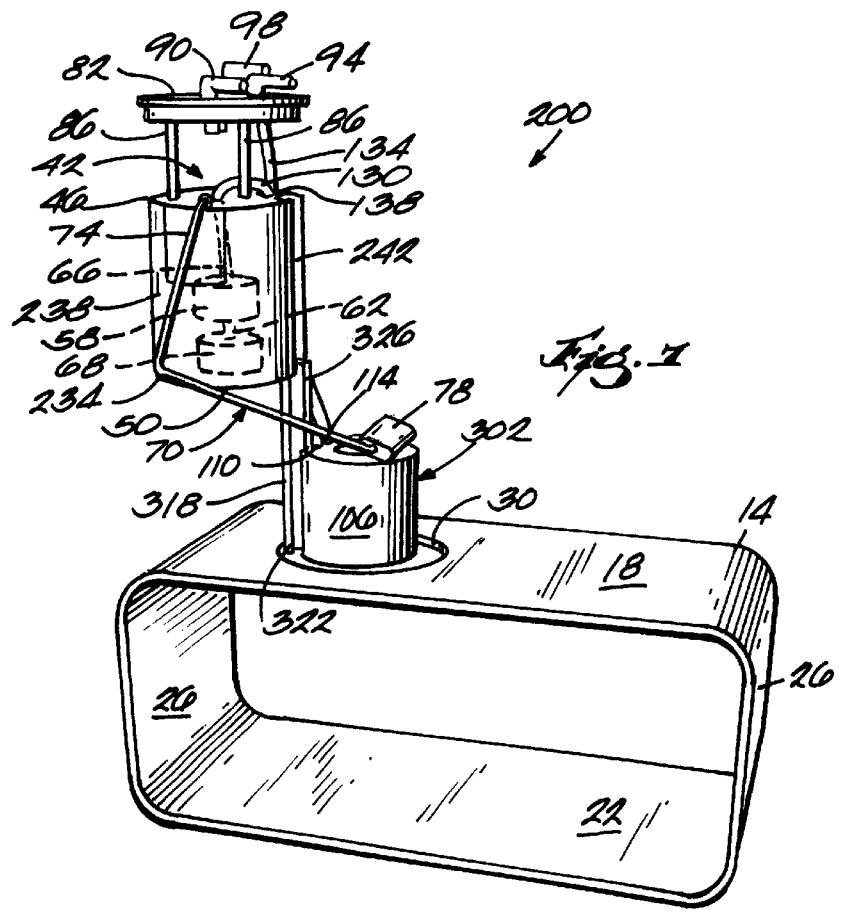
FIG. 7 is a perspective view of an alternative fuel pump module embodying the invention, prior to being inserted into the fuel tank.

Next, the entire fuel pump module 10 is moved laterally so that the reservoir 34 is aligned with the opening 30 (see FIG. 3). This lateral movement shifts the in-line fuel filter assembly 102 laterally inside the tank 14. The reservoir 34 is then partially inserted into the tank (see FIG. 4) until the in-line fuel filter assembly 102 contacts the bottom wall 22. As insertion continues, the in-line fuel filter assembly 102 pivots (see FIG. 5) with respect to the reservoir 34 about the pivot point 128. Pivoting is aided by the radius on the radiused end 122 of the extension member 118, which encourages pivoting upon engagement with the bottom wall 22.

As the in-line fuel filter assembly 102 pivots, the reservoir 34 is inserted into the tank 14 until the lower end 50 rests on the bottom wall 22 (see FIG. 6). When the reservoir 34 is resting on the bottom wall 22, the extension member 118 is substantially normal to the longitudinal axis of the reservoir 34 (which is substantially vertical in FIG. 6), and at least a portion of the extension member 118 rests on the bottom wall 22. The in-line fuel filter assembly 102 is now in its second or operating position. As seen in FIGS. 1–6, the in-line fuel filter assembly 102 is preferably pivoted approximately ninety degrees during the installation process to move from the installing position to the operating position.

When the fuel pump module 10 is installed, the float 78 rests on the bottom wall 22. Additionally, the flange 82 closes and seals the opening 30. Appropriate connection lines 142 can be connected to the electrical connector 90, the outlet port 94, and the inlet port 98.

FIGS. 7–13 illustrate a fuel pump module 200 that is an alternative embodiment of the present invention. Many of the features of the fuel pump module 200 are substantially the same as the fuel pump module 10 and will not be described again. Like parts have been given like reference numerals.

The fuel pump module 200 includes an in-line fuel filter assembly 302 having a cylindrical housing 106, filter media (not shown), a fuel inlet 110, and a fuel outlet 114 substantially identical to the corresponding features described with respect to the in-line fuel filter assembly 102. The difference between the in-line fuel filter assembly 302 and the in-line fuel filter assembly 102 is the manner in which the in-line fuel filter assembly 302 moves with respect to a slightly modified reservoir 234. The in-line fuel filter assembly 302 includes an extension member 318 connected to the cylindrical housing 106. The extension member 318 has a lower end 322 adjacent the cylindrical housing 106 and an upper end 326 spaced from the cylindrical housing 106. The extension member 318 is preferably T-shaped in cross-section (see FIG. 13), but could also have other cross-sectional configurations (e.g., L-shaped, triangularly shaped, and the like).

The reservoir 234 has an outer wall 238 with a groove 242 for slidably receiving the extension member 318. To accommodate the T-shaped cross-section of the extension member 318, the groove 242 includes (see FIGS. 8–10 and 13) a lateral slot 246 that extends the length of the groove 242. When positioned in the groove 242, the extension member 318 is constrained to linear movement within the groove along the length of the groove 242 (upward or downward in FIGS. 7–12). If the extension member has other cross-sectional configurations, the groove 242 can have a corresponding configuration to enable the same linear movement of the extension member 318. The groove 242 can be formed in any suitable manner, including being integrally formed during the molding of the reservoir 234 or being machined into a previously formed reservoir 234.

Unlike the pivoting relationship between the reservoir 34 and the in-line fuel filter assembly 102, the in-line fuel filter assembly 302 is linearly movable with respect to the reservoir 234, preferably in a slidable manner. In addition to sliding with respect to the reservoir 234, the in-line fuel filter assembly 302 could alternatively be telescopically coupled to the reservoir 234 such that a telescoping extension member (not shown) would achieve the same end result as the sliding extension member 318. The telescoping extension member could include several nestable segments that would telescopically extend and collapse as needed to allow installation of the fuel pump module 200.

Figure 8:
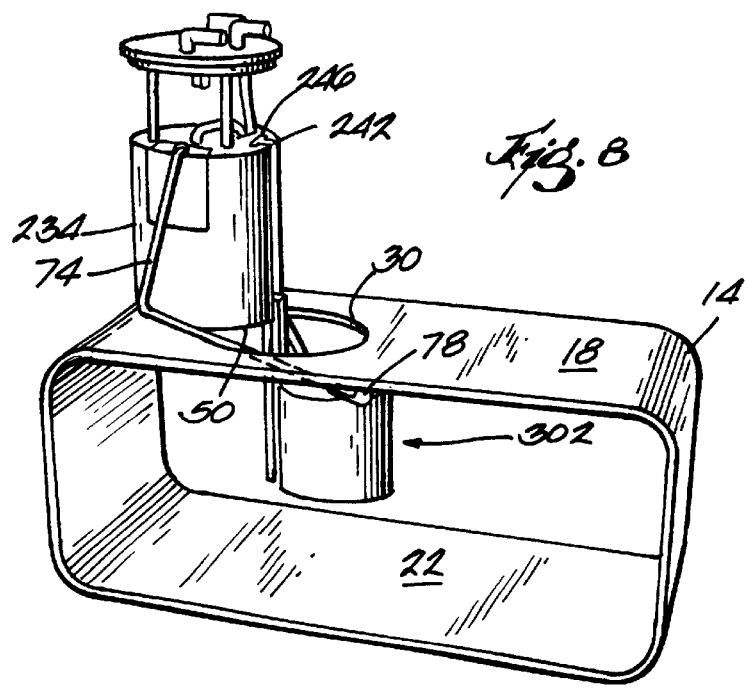
FIGS. 8–12 are perspective views of the fuel pump module of FIG. 7 being inserted into the fuel tank.

Installation of the assembled fuel pump module 200 into the fuel tank 14 occurs as follows. First, the in-line fuel filter assembly 302 is oriented in a first or installing position (see FIG. 7), wherein the in-line fuel filter assembly 302 is substantially below the lower end 50 of the reservoir 234. The extension member 318 is received in the groove 242 such that the upper end 326 is adjacent the lower end 50 of the reservoir 234. Any suitable method of retaining the extension member 318 in the slot can be used, including a tight fit between the upper end 326 and the lower portion of the groove 242, various stop configurations in the groove 242 and/or on the extension member 318, or even by limiting the length of the conduits 130 and 134. The in-line fuel filter assembly 302 is then inserted into the opening 30 as shown in FIG. 8 until the lower end 50 of the reservoir 234 is adjacent the top wall 18. The float 78 and a portion of the L-shaped arm 74 also enter the tank 14 through the opening 30.

Figure 9:
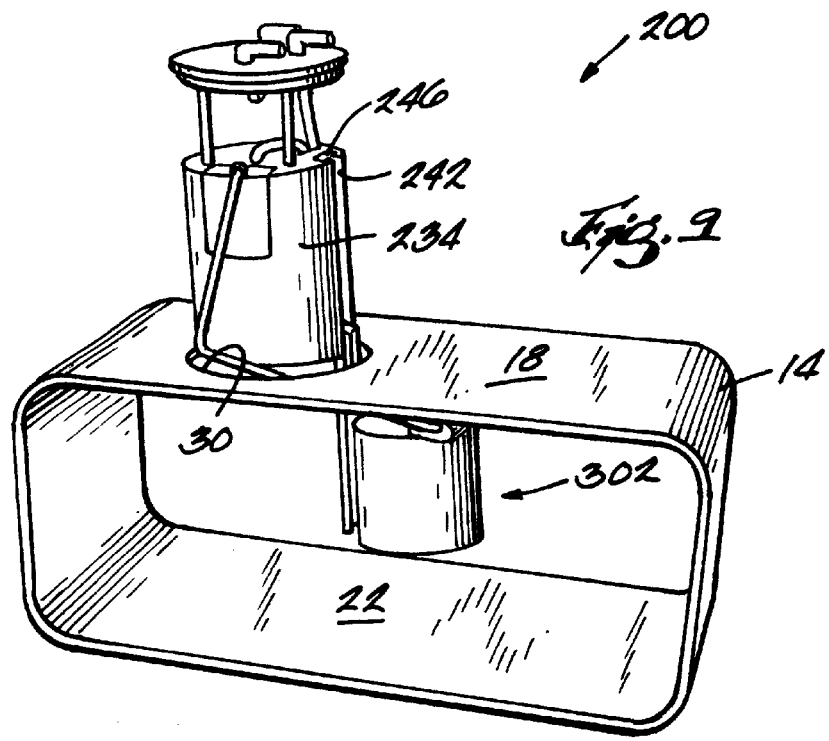
Figure 10:
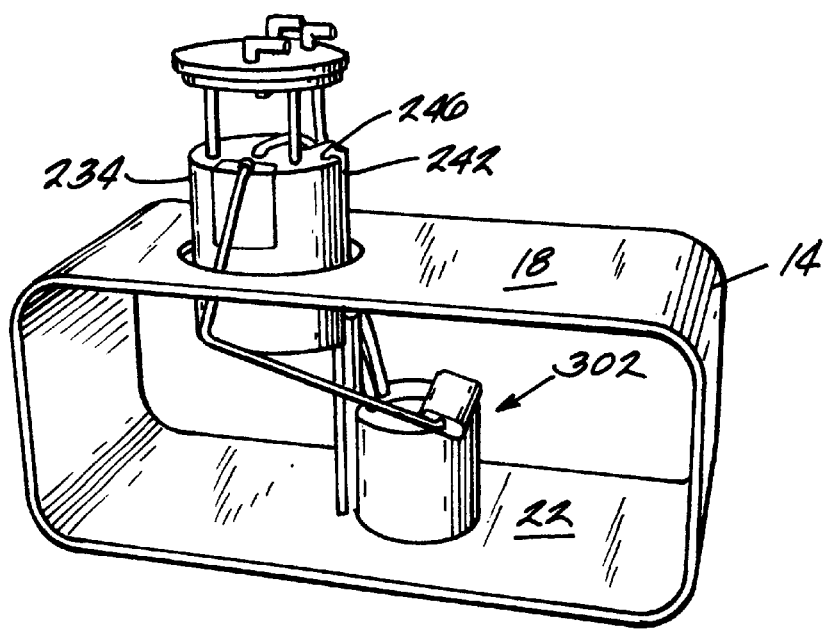
Figure 11:
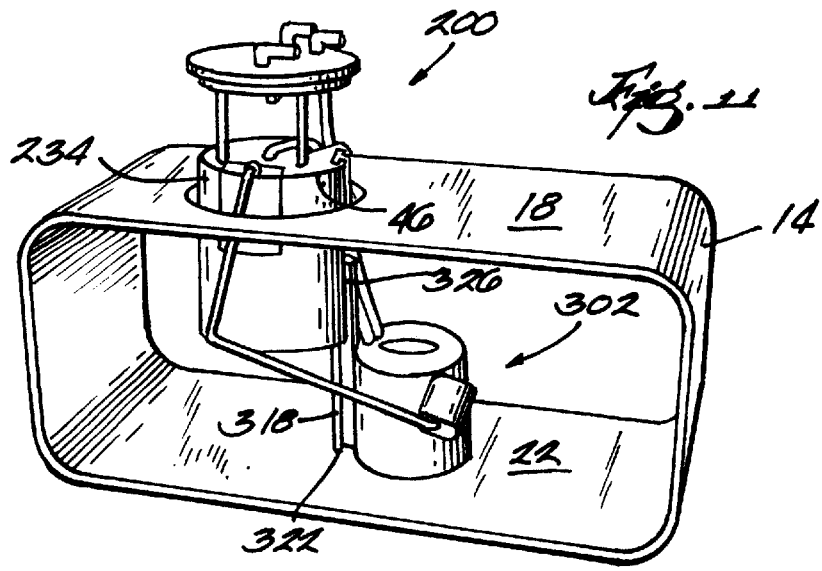

Next, the entire fuel pump module 200 is moved laterally so that the reservoir 234 is aligned with the opening 30 (see FIG. 9). This lateral movement shifts the in-line fuel filter assembly 302 laterally inside the tank 14. The reservoir 234 is then partially inserted into the tank (see FIG. 10) until the in-line fuel filter assembly 302 contacts the bottom wall 22. As insertion continues, the reservoir 234 slides down the extension member 318 (see FIG. 11) so that the upper end 326 approaches the upper end 46 of the reservoir 234.

Figure 12:
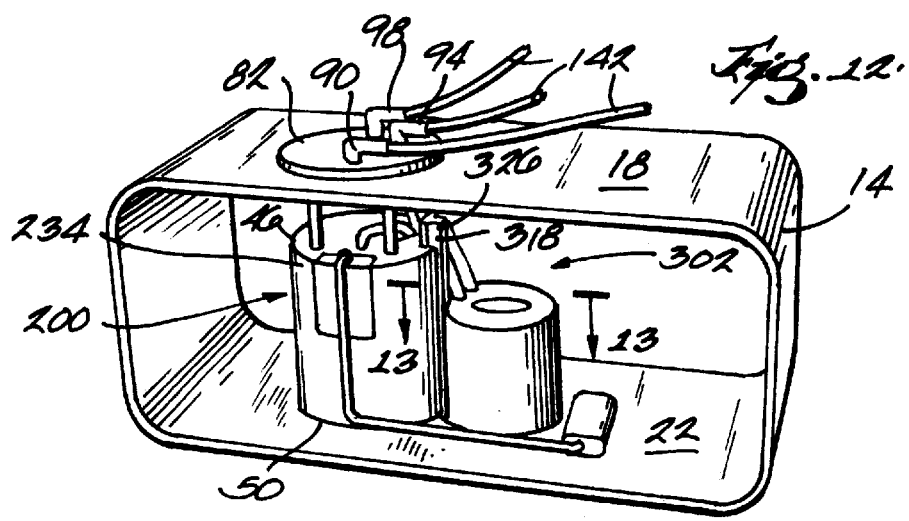
Figure 13:
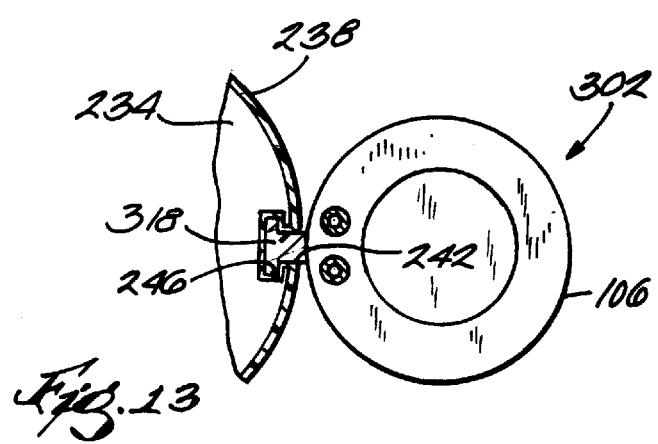
FIG. 13 is a section view taken along line 13—13 in FIG. 12.

The reservoir 234 is inserted into the tank 14 until the lower end 50 rests on the bottom wall 22 (see FIG. 12). When the reservoir 234 is resting on the bottom wall 22, the in-line fuel filter assembly is adjacent the reservoir 234 such that the lower end 322 (not shown in FIG. 12) of the extension member 318 is adjacent the lower end 50 of the reservoir 234 and the upper end 326 is adjacent to or upwardly spaced from the upper end 46 of the reservoir 234. The in-line fuel filter assembly 302 is now in its second or operating position. As seen in FIGS. 7–12, the extension member 318, and thus the in-line fuel filter assembly 302 slides linearly with respect to the reservoir 234 during the installation process to move from the installing position to the operating position.

Again, when the fuel pump module 200 is installed, the float 78 rests on the bottom wall 22. Additionally, the flange 82 closes and seals the opening 30. Appropriate connection lines 142 can be connected to the electrical connector 90, the outlet port 94, and the inlet port 98.

The fuel pump modules 10 and 200 illustrated in the figures provide an inexpensive and effective method for installing a fuel pump module in a low-profile fuel tank. The relative movement between the reservoir and the in-line fuel filter assembly facilitates the use of an in-line fuel filter that is large enough to accommodate today's larger and high-performance vehicles over the lifetime of the vehicle. It should be noted that the fuel pump modules 10 and 200 can include other features and components not described above or shown in the figures.

For example, it is possible to use the present invention with a reservoir that already includes a smaller in-line filter. By adding one of the in-line filter assemblies 102 or 302 to such a reservoir, it would be possible to increase the filtering capacity to accommodate vehicles having higher fuel consumption rates.

It should also be recognized that the fuel pump modules 10 and 200 could include a pressure regulator located somewhere inside the tank. The fuel system's pressure regulator was not discussed above as being a component of the fuel pump modules 10 and 200 since the pressure regulator can be located outside the tank as part of external portion of the fuel system. It is possible, however, to include the pressure regulator as part of the fuel pump modules 10 and 200. If the pressure regulator is included in the fuel pump modules 10 and 200, it can be positioned either upstream or downstream of the in-line fuel filter assemblies 102, 302.

Various features of the invention are set forth in the following claims.

What is claimed is:

1. A fuel pump module comprising:
   a fuel reservoir;
   a fuel pump communicating with the fuel reservoir and having a fuel outlet; and
   a fuel filter assembly movably coupled to the fuel reservoir to facilitate installation of the fuel pump module into a fuel tank, the fuel filter assembly communicating with the fuel outlet to filter fuel that has passed through the fuel pump.

2. The fuel pump module of claim 1, wherein the fuel filter assembly is movable with respect to the reservoir from an installing position, wherein the fuel pump module can be installed into the fuel tank, to an operating position, wherein the fuel pump module is supported inside the fuel tank.

3. The fuel pump module of claim 2, wherein the fuel filter assembly is pivotally movable from the installing position to the operating position.

4. The fuel pump module of claim 3, wherein the fuel filter assembly includes an extension member that is pivotally mounted to the reservoir.

5. The fuel pump module of claim 2, wherein the fuel filter assembly is linearly movable from the installing position to the operating position.

6. The fuel pump module of claim 5, wherein the fuel filter assembly includes an extension member that is linearly movable with respect to the reservoir.

7. The fuel pump module of claim 6, wherein the reservoir includes an outer wall having therein a groove for slidably receiving the extension member.

8. The fuel pump module of claim 7, wherein the extension member is substantially T-shaped in cross-section and wherein the groove includes a transverse slot that substantially constrains the extension member to linear movement when the extension member is received in the groove.

9. The fuel pump module of claim 2, further including a fuel level sensor for sensing the amount of fuel in the fuel tank.

10. The fuel pump module of claim 2, further including a flange connected to the reservoir for closing the fuel tank when the fuel pump module has been installed in the fuel tank.

11. The fuel pump module of claim 10, wherein the flange includes an outlet port communicating with the fuel filter assembly to allow filtered fuel to exit the fuel tank.

12. The fuel pump module of claim 11, wherein the fuel filter assembly communicates with the outlet port via a conduit extending between the outlet port and an outlet on the fuel filter assembly.

13. The fuel pump module of claim 12, wherein the reservoir includes a conduit channel for retaining the conduit.

14. The fuel pump module of claim 1, wherein the fuel filter assembly communicates with the fuel outlet via a conduit extending between the fuel outlet and an inlet on the fuel filter assembly.

15. The fuel pump module of claim 14, wherein the reservoir includes a conduit channel for retaining the conduit.

16. The fuel pump module of claim 14, wherein the conduit is a flexible tube.

17. A fuel pump module comprising:
   a fuel reservoir;
   a fuel pump communicating with the fuel reservoir and having a fuel outlet;
   a fuel filter assembly coupled to the fuel reservoir and movable with respect to the fuel reservoir to facilitate installation of the fuel pump module into a fuel tank, the fuel filter assembly being movable between an installing position, wherein the fuel pump module can be installed into the fuel tank, and an operating position, wherein the fuel pump module is supported inside the fuel tank, the fuel filter assembly communicating with the fuel outlet via a conduit to filter fuel that has passed through the fuel pump; and
   a flange connected to the reservoir for closing the fuel tank when the fuel pump module has been installed in the fuel tank, the flange including an outlet port communicating with the fuel filter assembly via a conduit to allow filtered fuel to exit the fuel tank.

18. A method of installing a fuel pump module in a fuel tank having an opening, the fuel pump module having a reservoir and a fuel filter assembly movably coupled to the reservoir, the method comprising:
   positioning the fuel filter assembly in a first position relative to the reservoir;
   inserting the fuel filter assembly into the fuel tank through the opening;
   inserting the reservoir into the fuel tank through the opening; and
   moving the fuel filter assembly with respect to the reservoir to a second position, thereby allowing the reservoir to be fully inserted into the fuel tank.

19. The method of claim 18, wherein inserting the reservoir into the fuel tank causes the moving of the fuel filter assembly with respect to the reservoir.

20. The method of claim 18, wherein inserting the reservoir and moving the fuel filter assembly occur substantially simultaneously.

21. The method of claim 18, wherein moving the fuel filter assembly includes pivoting the fuel filter assembly with respect to the reservoir.

22. The method of claim 18, wherein moving the fuel filter assembly includes linearly moving the fuel filter assembly with respect to the reservoir.

23. The method of claim 18, further including:

aligning the reservoir with the opening after inserting the fuel filter assembly into the fuel tank and before inserting the reservoir into the fuel tank, such that the fuel filter assembly moves laterally inside the fuel tank.

24. The method of claim 18, further including:

sealing the opening with a flange after the reservoir is inserted into the fuel tank.

* * * * *